(12) United States Patent
Keller

(10) Patent No.: US 8,482,939 B2
(45) Date of Patent: Jul. 9, 2013

(54) POWER SUPPLY

(75) Inventor: Anton Werner Keller, Arni (CH)

(73) Assignee: Thomson Licensing, Boulogne-Billancourt (FR)

( * ) Notice: Subject to any disclaimer, the term of this patent is extended or adjusted under 35 U.S.C. 154(b) by 431 days.

(21) Appl. No.: 12/734,787

(22) PCT Filed: Nov. 28, 2007

(86) PCT No.: PCT/IB2007/003664
§ 371 (c)(1),
(2), (4) Date: May 21, 2010

(87) PCT Pub. No.: WO2009/068930
PCT Pub. Date: Jun. 4, 2009

(65) Prior Publication Data
US 2010/0254165 A1    Oct. 7, 2010

(51) Int. Cl.
*H02M 3/335* (2006.01)

(52) U.S. Cl.
USPC .................... 363/21.05; 363/21.15

(58) Field of Classification Search
USPC ............ 363/16–19, 21.05, 21.07–21.12,
363/21.15, 21.18, 97, 56.11; 323/224, 225,
323/226, 284–289, 902
See application file for complete search history.

(56) References Cited

U.S. PATENT DOCUMENTS

| | | | |
|---|---|---|---|
| 3,731,144 A | 5/1973 | McKeown | |
| 4,710,695 A | 12/1987 | Yamada et al. | |
| 4,956,761 A * | 9/1990 | Higashi | 363/19 |
| 5,087,860 A * | 2/1992 | Doss | 315/224 |
| 5,276,393 A | 1/1994 | Gali | |
| 5,481,160 A * | 1/1996 | Nilssen | 315/209 R |
| 5,936,480 A | 8/1999 | Chong | |
| 6,044,002 A * | 3/2000 | Van Der Wal et al. | 363/97 |
| 6,134,123 A * | 10/2000 | Yamada | 363/21.13 |
| 6,166,926 A | 12/2000 | Nath | |
| 6,233,164 B1 | 5/2001 | Zee et al. | |
| 6,519,165 B2 * | 2/2003 | Koike | 363/21.12 |
| 7,154,252 B2 * | 12/2006 | Arthur | 323/282 |
| 7,218,532 B2 * | 5/2007 | Choi et al. | 363/21.01 |
| 7,394,669 B2 * | 7/2008 | Fahlenkamp et al. | 363/21.15 |
| 7,911,814 B2 * | 3/2011 | Tao et al. | 363/21.12 |

FOREIGN PATENT DOCUMENTS

| | | |
|---|---|---|
| EP | 1156580 | 11/2001 |
| JP | 10-174432 A | 6/1998 |
| WO | WO2004/030194 | 4/2004 |

* cited by examiner

*Primary Examiner* — Rajnikant Patel
(74) *Attorney, Agent, or Firm* — Robert D. Shedd; Sammy S. Henig

(57) ABSTRACT

A switching "power (100) includes a single, power switching Metal-Oxide-Semiconductor Field Effect Transistor (MOSFET) (Q1) that without any additional transistor provides both self-oscillation and over-current protection. A transformer (Tr1) that is included in a positive feedback path of the MOSFET has a tapped (intermediate terminal 103) auto-transformer winding. A source terminal (102) of the MOSFET is coupled via a current limiting resistor (R2) to a junction terminal between first (n1) and second (n2) windings of the tapped auto-transformer (Tr1). The first winding forms the primary winding of the transformer and the second winding is coupled to a gate terminal of the MOSFET to form a regenerative feedback path. The second winding is direct-current (DC) coupled to the gate terminal to avoid the need for any discrete capacitor in the positive feedback path.

12 Claims, 3 Drawing Sheets

POWER SUPPLY

This application claims the benefit, under 35 U.S.C. § 365 of International Application PCT/IB2007/003664 and filed Nov. 28, 2007, which was published in accordance with PCT Article 21(2) on Jun. 4, 2009, in English.

FIELD OF THE INVENTION

The invention relates to a switching power supply.

BACKGROUND OF THE INVENTION

Switching power supplies using discrete components are usually constructed with at least two transistors. One transistor is used for switching current in a primary winding of a transformer coupled in series with a main current path of the transistor. The other one transistor is used for providing over-current protection in the first transistor. It may be desirable to form a switching power supply with a power switching Metal-Oxide-Semiconductor Field Effect Transistor (MOSFET) as an active element such that, without any additional active element, both self-oscillation and over-current protection are provided by the MOSFET.

In carrying out an inventive feature, a transformer that is included in a positive feedback path of the MOSFET has a tapped auto-transformer winding. A source terminal of the MOSFET is coupled via a current limiting or sampling resistor to a junction terminal between first and second windings of the tapped auto-transformer winding. The first winding forms the primary winding of the transformer and the second winding is coupled to a gate terminal of the MOSFET to form a regenerative feedback path.

In carrying out another inventive feature, the second winding is direct-current (DC) coupled to the gate terminal to avoid the need for any discrete capacitor in the positive feedback path. Thereby, advantageously, the power supply is simplified.

SUMMARY OF THE INVENTION

A power supply, embodying an aspect of the invention, includes a source of input supply voltage. A transformer is coupled to a load for energizing the load. A switching, power metal-Oxide-Semiconductor Field Effect Transistor (MOSFET) has a source terminal coupled to the transformer and has a drain terminal coupled to the input supply voltage. A ramping current that stores magnetic energy in the transformer is produced. The ramping current develops a voltage at the source terminal of the MOSFET. The source terminal voltage is coupled to a gate terminal of the MOSFET via the transformer by an auto-transformer action in a regenerative feedback manner, during a first portion of a switching cycle of the MOSFET, when the MOSFET is conductive. A current sampling resistor is coupled in a current path of the ramping current for developing a ramping, degenerative voltage in the resistor voltage to reduce the conductivity of the MOSFET in accordance with the resistor voltage until a turn off threshold voltage of the MOSFET is reached. When the turn off threshold voltage of the MOSFET is reached, the source terminal voltage changes in a degenerative feedback manner. The change in the source terminal voltage continues until the MOSFET becomes non-conductive at an end of the cycle portion. The MOSFET remains non-conductive until an oscillatory resonant voltage produced from the stored magnetic energy renders the MOSFET conductive again, at an end of a following, second portion of the switching cycle.

DETAILED DESCRIPTION OF PREFERRED EMBODIMENTS

Figure 1:
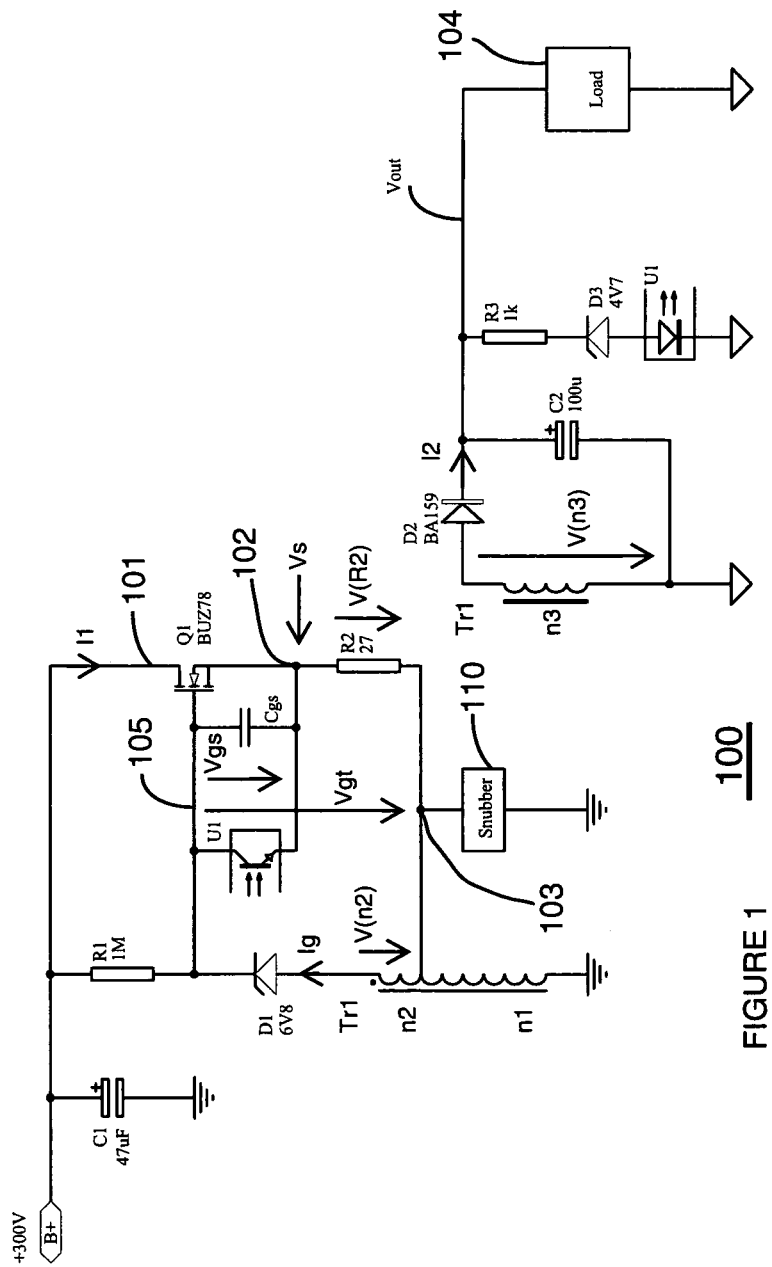
FIG. 1 illustrates a first embodiment of the invention.

FIG. 1 depicts a switching power supply 100. A switching, power Metal-Oxide-Semiconductor Field Effect Transistor (MOSFET) Q1 has a drain terminal 101 coupled to an input supply voltage Vin. Supply voltage Vin is filtered or decoupled by a filter capacitor C1. A source terminal 102 of MOSFET Q1 is coupled via a current limiting or sampling resistor R2 to a transformer tap or intermediate terminal 103 coupled between a winding n1 and a winding n2 of a transformer Tr1. Windings n1 and n2 provide an auto-transformer action. Transformer Tr1 is formed by a core E16-Type with an air gap of 0.1 mm. Winding n1 has 130 windings and an inductance of 190 mH. Winding n2 has 16 windings and an inductance of 2.8 mH. A winding n3 of transformer Tr1 has 8 windings and an inductance of 0.7 mH.

A main current path of a drain current I1 includes drain terminal 101, source terminal 102 and current limiting resistor R2. Current I1 flows when MOSFET Q1 is conductive for storing magnetic energy in transformer Tr1. When MOSFET Q1 is conductive, a source voltage Vs is coupled via resistor R2 to terminal 103 for producing a voltage V(n2) in winding n2 by an auto-transformer action of windings n1 and n2.

In carrying out an inventive feature, source terminal 102 is direct-current (DC) coupled to a gate terminal 105 of MOSFET Q1 via winding n2 and a zener diode D1. Zener diode D1 operates in a breakdown mode to provide DC voltage level shifting. Thereby, advantageously, there is no need for a discrete coupling capacitor in a signal path between terminals 102 and 105.

FIGS. 2a, 2b, 2c and 2d provide corresponding waveforms useful for explaining power supply 100 of FIG. 1. Similar symbols and numerals in FIGS. 2a, 2b, 2c, 2d and 1 indicate similar items or functions.

At a time T1 of a switching cycle time T of FIGS. 2a-2d, a resonant voltage Vgt shown in FIG. 2b, developed between gate terminal 105 of FIG. 1 and transformer intermediate terminal 103 reaches a turn-on threshold level of MOSFET Q1 to initiate conduction in MOSFET Q1, as described below. Consequently, a voltage Vs is developed at source terminal 102 from voltage Vin. Voltage Vs is transformer coupled in a regenerative feedback manner by an auto-transformer action via winding n1 to winding n2 to produce voltage V(n2) in winding n2. Voltage V(n2) enhances the conductivity of MOSFET Q1 to render MOSFET Q1 fully conductive. Consequently, ramping-up current I1 is produced, during an interval T1-T2 of cycle time T of FIG. 2c.

Current sampling resistor R2 of FIG. 1 develops a corresponding ramping-up, degenerative voltage V(R2) in current limiting R2 that varies a voltage Vgs in a gate-source capacitance Cgs that is formed between gate terminal 105 and source terminal 102 of FIG. 1. Voltage V(R2) reduces the conductivity of MOSFET Q1 in a progressive manner as current I1 of FIG. 2c further increases, during an interval T1-T2. At time T2 FIG. 2b a conductivity threshold of MOS- FET Q1 of FIG. 1, determined by the value of resistor R2 and current I1 is reached. Consequently, voltage Vs in FIG. 2a begins decreasing.

Figure 2:
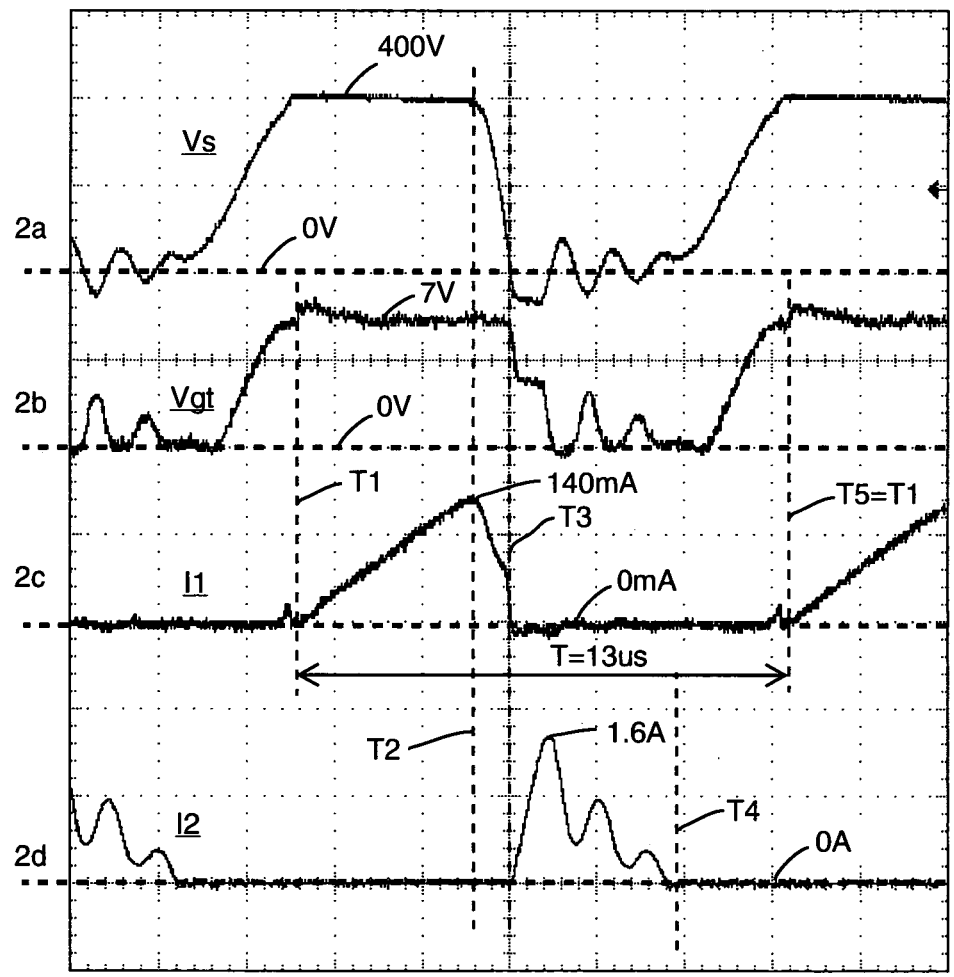
FIGS. 2a, 2b, 2c and 2d provide corresponding waveforms in the arrangement of FIG. 1.

In carrying out another inventive feature, the decrease in voltage Vs causes a corresponding decrease in voltage V(n2) in winding n2 of FIG. 1 and also in voltage Vgt in a degenerative feedback manner until MOSFET Q1 becomes non-conductive at time T3 of FIG. 2c. Thus, advantageously, MOSFET Q1 forms the sole active element in the over-current protection signal path to provide both self-oscillations and over-current protection. A conventional snubber network 110 is coupled to terminal 103 to perform a snubber network function, beginning at time T2 of FIG. 2a.

As a result of current I1 ceasing to flow in winding n1, the stored magnetic energy in transformer Tr1 of FIG. 1 produces a flyback voltage V(n3) of FIG. 1 in secondary winding n3 of transformer Tr1 in a polarity and magnitude that causes the turn-on of a rectifier diode D2 and the generation of an output current I2. Current I2 of FIG. 2d charges an output filter capacitor C2 of FIG. 1 to develop an output supply voltage Vout that is isolated by transformer Tr1 from windings n1 and n2 with respect to electrical shock hazard. Voltage Vout is applied to energize a load 104.

MOSFET Q1 remains non-conductive, during a following interval, T3-T5, of cycle time T of FIG. 2c. At a time T4 of FIG. 2d, diode D2 of FIG. 1 becomes non-conductive. Consequently, the remaining stored energy in transformer Tr1 produces an oscillatory resonant voltage portion 106 in voltage Vgt of FIG. 2b. At time T5 of FIG. 2b, rising voltage Vgt causes gate-source voltage Vgs to exceed the threshold of MOSFET Q1 of FIG. 1 that renders MOSFET Q1 conductive, at an end of interval T3-T5 of FIG. 2c for beginning the next cycle.

At start-up, a start-up resistor R1 of FIG. 1 that is coupled to gate terminal 105 produces a current that charges parasitic gate capacitance Cgs until MOSFET Q1 turns on. Resistor R1 is only needed for start-up and the value can be in the mega-ohm range. When current I1 starts flowing into winding n1 of transformer Tr1, voltage V(n2) develops in winding n2. Voltage V(n2) causes an increase in voltage Vgt and supports the turn on of MOSFET Q1 in a regenerative feedback manner, in a way similar to that explained before.

A series arrangement that includes a resistor R3, a reference voltage producing zener diode D3 and a light emitting element of an opto-coupler U1 that is coupled to voltage Vout provides a secondary side regulation. Diode D3 starts conducting when voltage Vout is above a threshold voltage of 6V. Consequently, opto-coupler U1 clamps voltage Vgs such that MOSFET Q1 is prevented from being turned on until voltage Vout is reduced to a level below 6V. The efficiency is 60% and thus within the range of other power supplies with an output power of 1 Watt or less.

Figure 3:
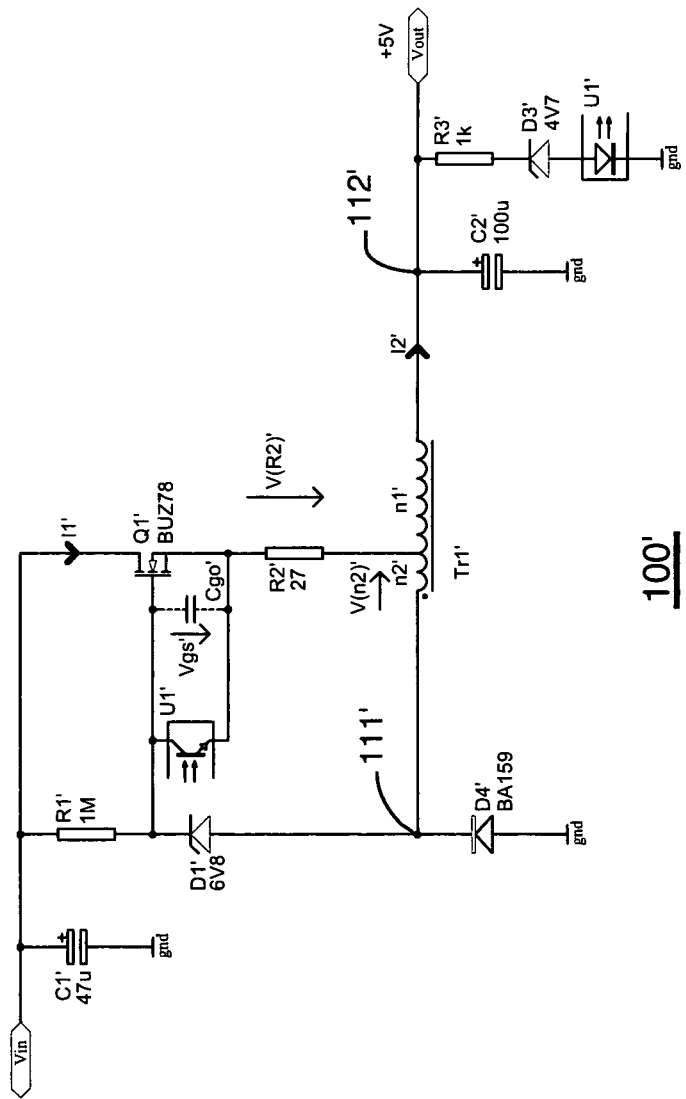
FIG. 3 illustrates a second embodiment of the invention.

FIG. 3 depicts a power supply 100' forming a second embodiment of the invention that is a step down converter. Similar symbols and numerals in FIGS. 3 and 1 indicate similar items or functions. A free-wheel or catch diode D4' is coupled to the anode of diode D1'. Winding n2' has an end terminal 111'. End terminal 111' forms a junction terminal to diodes D1' and D4. Winding n1' has an end terminal 112'. End terminal 112' forms a junction terminal between capacitor C2' and resistor R3. Single transistor Q1' oscillates autonomously as described with respect to FIG. 1. Transformer Tr1' is formed by a core having a straight cylindrical rod. Winding n1' has 70 windings and an inductance of 50 mH. Winding n2' has 15 windings and an inductance of 2.5 mH.

The invention claimed is:

1. A power supply, comprising:
a source of input supply voltage;
a transformer coupled to a load for energizing said load;
a switching, power Metal-Oxide-Semiconductor Field Effect Transistor (MOSFET) having a source terminal coupled to said transformer and having a drain terminal coupled to said source of input supply voltage for producing a ramping current that stores magnetic energy in said transformer and for developing a voltage at said source terminal of said MOSFET that is coupled to a gate terminal of said MOSFET via said transformer by an auto-transformer action in a regenerative feedback manner, during a first portion of a switching cycle of said MOSFET, when said MOSFET is conductive; and
a current sampling resistor coupled in a current path of said ramping current for developing a ramping, degenerative voltage in said resistor to reduce the conductivity of said MOSFET in accordance with said resistor voltage until a turn off threshold voltage of said MOSFET is reached, such that when said turn off threshold voltage of said MOSFET is reached, said source terminal voltage changes in a degenerative feedback manner until said MOSFET becomes non-conductive at an end of said cycle first portion, said MOSFET remaining non-conductive until an oscillatory resonant voltage produced from the stored magnetic energy renders said MOSFET conductive again, at an end of a following, second portion of said switching cycle.

2. A power supply according to claim 1 wherein said source terminal is coupled to said gate terminal via a first winding of said transformer to form a direct-current (DC) signal path.

3. A power supply according to claim 2 wherein said first winding is coupled to said gate terminal via a DC level shifter.

4. A power supply according to claim 3 wherein said level shifter comprises a Zener diode.

5. A power supply according to claim 1 wherein said transformer includes a first transformer winding that is coupled to said gate terminal and a second transformer winding that is coupled to said first winding via a junction terminal to provide the auto transformer action and wherein said resistor is coupled between said source terminal and said junction terminal.

6. A power supply according to claim 1 wherein said resistor provides protection against over-current in said MOSFET.

7. A power supply according to claim 1 wherein said MOSFET forms a sole active element in a signal path that provides both self-oscillation and over-current protection.

8. A power supply according to claim 1, further comprising a second transistor coupled to said MOSFET for regulating an output of said power supply.

9. A power supply, comprising:
a source of input supply voltage;
a transformer coupled to a load for energizing said load, said transformer having a first transformer winding and a second transformer winding to provide an auto transformer action; and
a switching, power Metal-Oxide-Semiconductor Field Effect Transistor (MOSFET) having a source terminal coupled to a junction terminal between said first and second windings, a drain terminal coupled to said source of input supply voltage and a gate terminal coupled to a terminal of said first winding remote from said junction terminal to form a regenerative feedback manner that produces self oscillations such that said source terminal is coupled to said gate terminal by the auto transformer action to form a direct-current (DC) signal path between said source and said gate terminal via said first winding, said MOSFET forming a sole active element in a signal path that provides the self-oscillations.

10. A power supply according to claim 9, further comprising a current sampling resistor coupled between said source terminal and said junction terminal.

11. A power supply according to claim 9 wherein said first winding is coupled to said gate terminal via a DC level shifter.

12. A power supply according to claim 11 wherein said level shifter comprises a Zener diode.

* * * * *